(12) United States Patent
Sawyer

(10) Patent No.: US 6,926,416 B2
(45) Date of Patent: Aug. 9, 2005

(54) MULTI-VIEW VISOR MIRROR

(76) Inventor: Bradley Sawyer, 62 Homestead La., Yarmouth Port, MA (US) 02675

( * ) Notice: Subject to any disclaimer, the term of this patent is extended or adjusted under 35 U.S.C. 154(b) by 0 days.

(21) Appl. No.: 10/680,738

(22) Filed: Oct. 7, 2003

(65) Prior Publication Data

US 2004/0125474 A1 Jul. 1, 2004

Related U.S. Application Data

(60) Provisional application No. 60/416,754, filed on Oct. 7, 2002.

(51) Int. Cl.[7] .......................... G02B 5/08; G02B 7/182; B60R 1/04
(52) U.S. Cl. ...................... 359/855; 359/865; 359/840; 359/903; 248/467; 248/479
(58) Field of Search .............................. 359/840, 841, 359/850, 854, 855, 865, 872, 903; 248/467, 476, 479, 486

(56) References Cited

U.S. PATENT DOCUMENTS

| | | | | |
|---|---|---|---|---|
| 1,088,764 A | * | 3/1914 | Booth | 359/854 |
| 2,097,419 A | * | 10/1937 | Schmidt | 359/602 |
| 2,140,069 A | * | 12/1938 | Bostwick | 359/854 |
| 3,588,233 A | * | 6/1971 | Lambert | 359/844 |
| 3,589,049 A | * | 6/1971 | Cornelius | 40/722 |
| 3,977,774 A | * | 8/1976 | O'Sullivan | 359/851 |
| 4,394,065 A | * | 7/1983 | Swanson | 359/844 |
| 4,421,355 A | * | 12/1983 | Marcus | 296/97.5 |
| 4,487,479 A | * | 12/1984 | Tolomeo, Sr. | 359/854 |
| 4,764,852 A | * | 8/1988 | Sakuma | 362/135 |
| 4,775,231 A | * | 10/1988 | Granzow et al. | 359/860 |
| 4,973,020 A | * | 11/1990 | Canadas | 248/467 |
| 6,007,206 A | * | 12/1999 | Chang | 359/850 |

FOREIGN PATENT DOCUMENTS

NO    0065043    *   7/1942

* cited by examiner

Primary Examiner—Ricky D. Shafer
(74) Attorney, Agent, or Firm—McCormick, Paulding & Huber LLP

(57) ABSTRACT

The present invention provides a multi-view mirror having a mirror frame including an inwardly disposed center and two outwardly disposed mirror mounting elements attached to the frame on opposite sides of the center. The multi-view mirror includes a first mirror having an outward edge pivotally mounted to one of the mounting elements of the frame and an inward edge disposed inwardly of the outward edge near the center of the frame and a second mirror having an outward edge pivotally mounted to one of the mounting elements of the frame and an inward edge disposed inwardly of the outward edge near the center of the frame. The first mirror and second mirror are angularly positionable relative to the frame wherein at least one of the first and second mirrors are pivoted about one of the mounting elements to form a generally angled mirror.

11 Claims, 4 Drawing Sheets

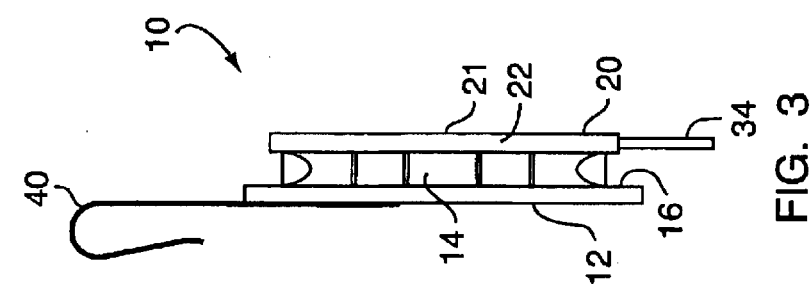
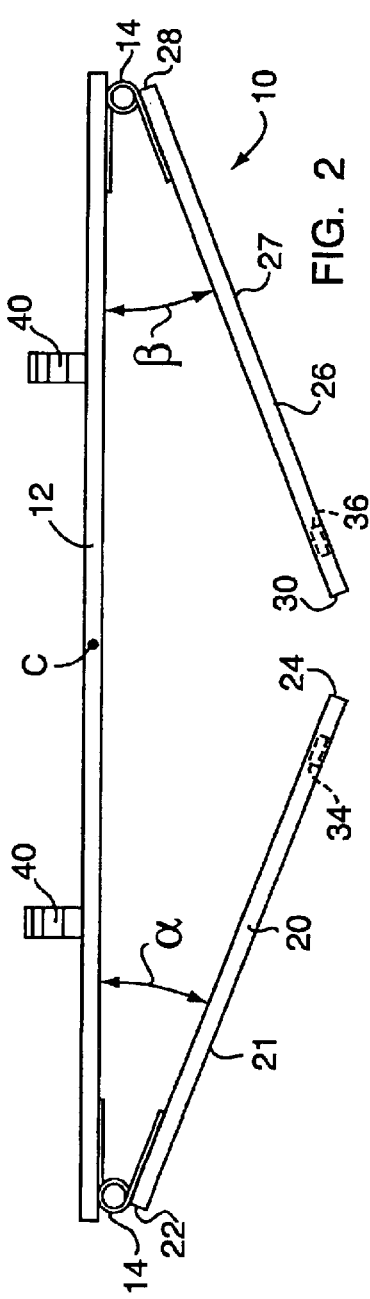
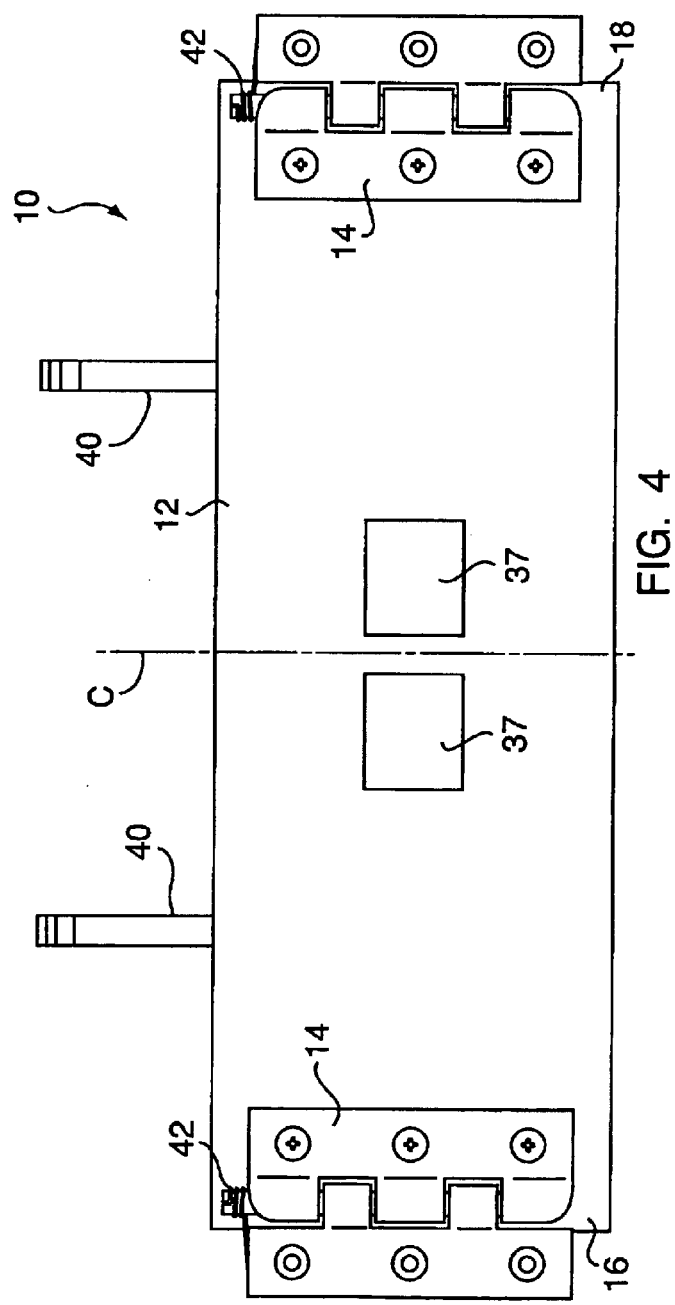

MULTI-VIEW VISOR MIRROR

CROSS REFERENCE TO RELATED APPLICATIONS

This application claims priority to provisional patent application Ser. No. 60/416,754, file Oct. 7, 2002 and titled "Multi-View Visor Mirror". The disclosure of the provisional application is incorporated in its entirety herein by reference.

FIELD OF THE INVENTION

The present invention generally relates to a mirror, and more particularly to an adjustable multi-view mirror for extending the field of view of a user thereof.

BACKGROUND OF THE INVENTION

Multi-view mirrors for extending the view of a user are known in the art, however, most prior art mirrors of this type are designed to be mounted on a rear view mirror of an automobile and either replace the original mirror or mount thereto extending the view thereof rearward of the user of the mirror. Additionally, convex mirrors are known to extend the field of view of a user, however convex mirrors also distort the viewed objects and reduce a perception of distance.

Further, most prior art multi-view mirrors do not extend the peripheral view of a user directly left and right of a person viewing the mirror. For many handicapped people and persons with limited mobility in the head and neck or eyes, currently available prior art mirrors do not significantly extend the range of view of a forward viewing user. Additionally, most prior art multi-view mirrors require a user to turn toward the mirror to view in an opposite direction and even then the field of view is usually limited to a direction rearward of the user, thus, for viewing in a direction perpendicular to a user, prior art multi-view mirrors have limited usefulness.

Based on the foregoing, it is the general object of the present invention to provide a multi-view mirror that improves upon, or overcomes the problems and drawbacks associated with prior art wide view mirrors.

SUMMARY OF THE INVENTION

The present invention resides in a multi-view mirror that includes a mirror frame having an inwardly disposed center and two outwardly disposed mirror mounting elements attached to the mirror frame at opposite sides of the center of the mirror frame. The present invention multi-view mirror includes first and second mirrors each having an outward edge pivotably mounted to one of the mirror mounting elements and an inward edge disposed near the center of the mirror frame. Each of the first and second mirrors are angularly positionable relative to the mirror frame by pivoting the mirror about the corresponding mounting element to form an angled mirror. The first and second mirrors are also positionable in a closed, generally flat position with the inward edges of the first and second mirrors substantially adjacent one another near the center of the frame. Both of the first and second mirrors in the closed position combine to form a generally flat continuous mirror. Thus, the present invention provides a multi-view mirror for allowing a forward viewing user an extended field of view including the entire rear and the sides of the user without requiring the user to rotate his neck.

In one embodiment of the present invention, the mounting elements on the outward edges of mirror frame are hinges that pivotably attach the outer edges of the first and second mirrors to the outer edges of the mirror frame allowing the first and second mirror to pivot relative to the mirror frame. The first and second mirrors also have handles attached near the inward edges thereof that allow a user to manually position the first and second mirrors relative to the mirror frame.

The first and second mirrors may further include extendable portions which may be used to lengthen the total reflective surface provided. Additionally, the first and second mirrors can be angularly positioned with respect to the mirror frame using automated means such as an electric motor coupled to the first and second mirrors, for use by severely handicapped persons.

Accordingly, the present invention multi-view mirror provides first and second mirrors positionable in a wide range of angles which allow a forward viewing user to extend his view to approximately 360 degrees. The present invention multi-view mirror extends the range of view of a forward viewing user to include approximately 270 degrees or greater including from directly behind the user and both sides of the user extending to greater than 45 degrees in front of the viewer without requiring any rotation of the viewer's neck.

In another aspect, the present invention allows a forward viewing user thereof to view directly to the left and to the right simultaneously wherein a left eye of the user is focused on the first mirror for viewing to the user's left and the right eye of the user is focused on the second mirror for viewing to the user's right.

Additionally, the multi-view mirror of the present invention can include only one mirror pivotably mounted to a mirror frame wherein depending on how the mirror frame is mounted, the mirror can be pivoted to a forward viewing user's left or right to extend for extending the viewable range of a user thereof.

In another embodiment of the present invention multi-view mirror, the first and second mirrors include reflective surfaces on both sides thereof, further extending the field of view of a user thereof.

Consequently, the present invention extends the viewing range of a forward viewing user to an entire 360 degree field about without rotation of the head or neck of the user. When not in use, the first and second mirrors can be collapsed into a closed, generally flat position that is compact, unobtrusive, and secure.

In accordance with the present invention, a releasable fastener means, such as a pair of magnets, is attached to the mirror frame to releasably retain the first and second mirrors in a closed, generally flat position. Additionally, springs may be used to urge the mirrors toward a closed, generally flat position.

In further accordance with the present invention, an attachment means, such as clips or hooks, is provided to attach the multi-view mirror to a surface. In one embodiment of the present invention, hooks are provided on the mirror frame to attach the multi-view to the sun visor of an automobile thereby allowing the driver a view towards the sides of the vehicle.

BRIEF DESCRIPTION OF THE DRAWINGS

FIG. 2 is a top view of the multi-view mirror of FIG. 1 wherein both of the first and second mirrors are angularly positioned relative to the mirror frame.

FIG. 3 is a side elevational view of the multi-view mirror of FIG. 1.

FIG. 4 is a front elevational view of a mirror frame according to the present invention.

DETAILED DESCRIPTION OF THE INVENTION

Figure 1:
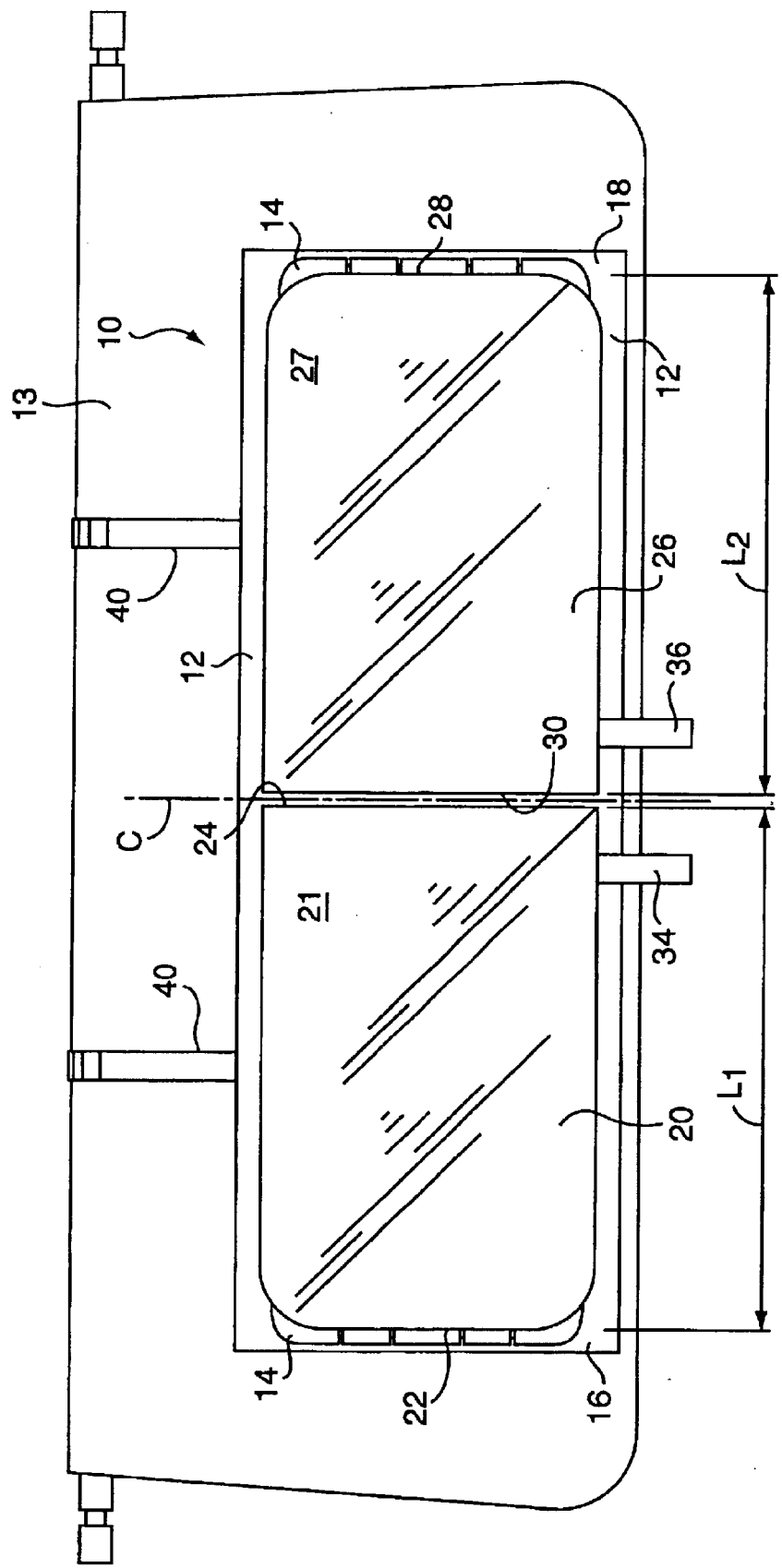
FIG. 1 is a front elevational view of a multi-view mirror according to the present invention shown in a closed position.

As shown in FIG. 1, the present invention is directed to a multi-view mirror generally designated by the reference number 10. The multi-view mirror 10 includes a mirror frame 12 having a pair of hinges 14 attached to outwardly opposing first and second outer edges 16 and 18 respectively, of the mirror frame. A first mirror 20 having a reflective surface 21, has an outward edge 22 pivotably mounted to the first outer edge 16 of the mirror frame 12 via one of the hinges 14 and an inward edge 24 disposed inwardly of the outward edge 22 near a center "C" of the mirror frame 12. A second mirror 26 having a reflective surface 27, has an outward edge 28 pivotably mounted to the second edge 18 of the mirror frame 12 with a hinge 14. The second mirror 26 also has an inward edge 30 disposed inwardly of the outward edge 28 near the center "C" of the mirror frame 12.

Still referring to FIG. 1, adjustment handles 34 and 36 are attached near the inward edges 24 and 30 of the first and second mirrors 16 and 18 respectively. The adjustment handle 34 provides means for a user to pivot the first mirror 20 about the axis of the hinge 14 to angularly adjust the position of the first mirror relative to the mirror frame 12. Similarly the handle 36 provides means for a user to pivot the second mirror 26 about the axis of the hinge 14 to angularly adjust the position of the second mirror relative to the mirror frame 12.

FIG. 2 shows the multi-view mirror 10 wherein the first mirror 20 is positioned at an angle α with respect to the mirror frame 12 and the second mirror 26 is positioned at an angle β with respect to the mirror frame 12.

Referring to FIGS. 1 and 3 the mirror frame 12 has an attachment means for attaching the multi-view mirror 10 to a surface. In the illustrated embodiment, the attachment means are shown as a pair of clips 40 that hook onto a surface, such as a sun visor in an automobile. Alternatively, a single clip may be used to attach the multi-view mirror 10 to a visor. Other types of attachment means such as Velcro®, tape, or suction cups may also be used to attach the mirror frame 12 to a surface.

Referring to FIG. 4, one embodiment of the mirror frame 12 according to the present invention includes a pair of magnets 36, 36 for releasably attaching to a rear surface of each of the first and second mirrors 20 and 26 for releasably securing the multi-view mirror 10 in the closed position. The pair of magnets 36, 36 may directly attract the rear surfaces of the first second mirrors 16 and 18 or attract a second pair of magnets (not shown) attached to the rear surfaces of the first and second mirrors 16 and 18. Although a pair of magnets are described to secure the first and second mirrors 16 and 18 in the closed position, the present invention is not limited in this regard as other types of releasable fasteners well known in the art could also be used to releasably retain the first and second mirrors 16 and 18 in the closed position.

Alternatively, as shown in FIG. 4, springs 42 coupled to the hinges 14 bias the first and second mirrors 16 and 18 respectively toward the closed position. Further a spring attached between each of the first and second mirrors 16 and 18 respectively and the mirror frame 12 could be provided to retain the multi-view mirror 10 in the closed position.

Figure 5:
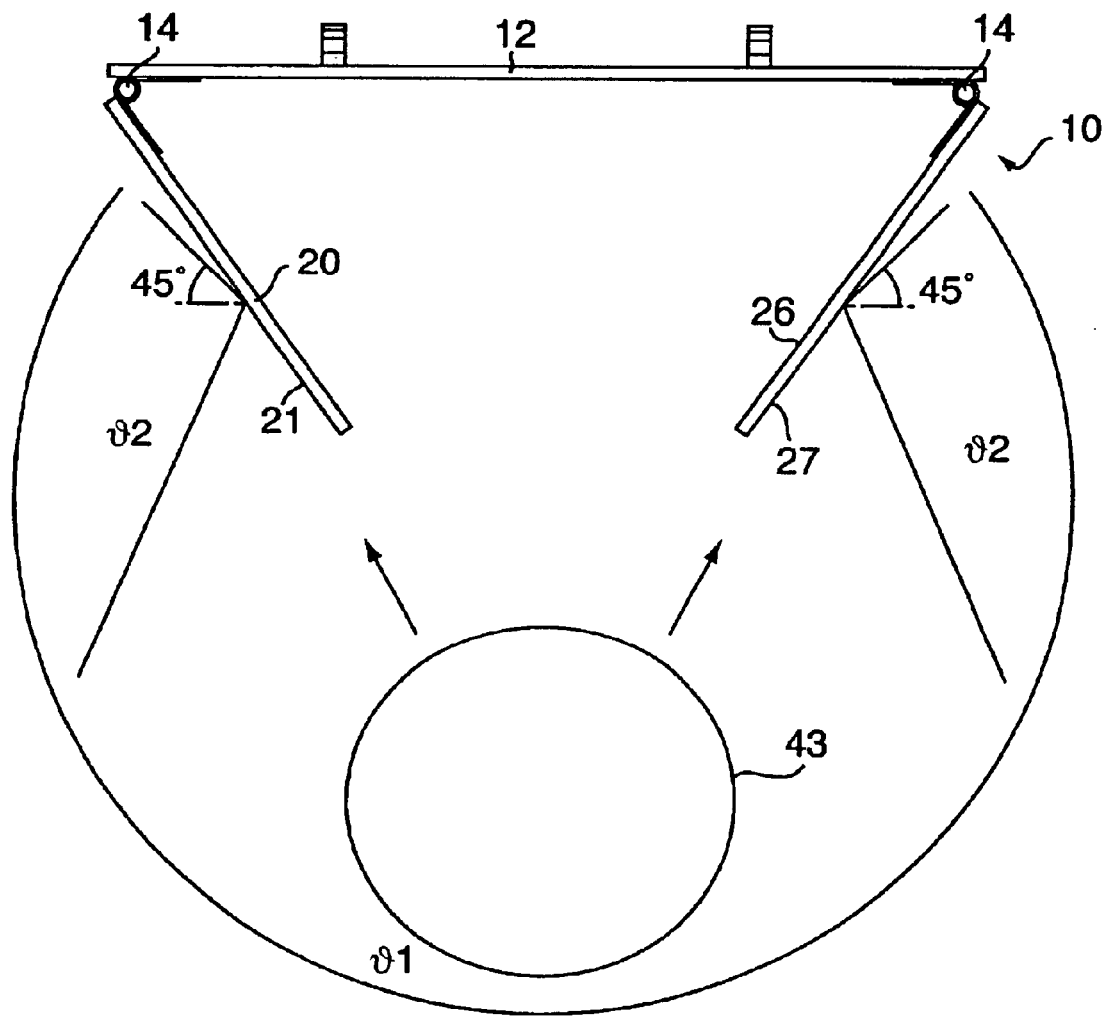
FIG. 5 shows an approximation of the field of view of a forward viewing user of a multi-view mirror according to the present invention.

In using the multi-view mirror 10, a user selects a desired position of each of the first and second mirrors from a wide range that extends from a generally flat mirror to an angled mirror. The user positions each of the first and second mirrors 16 and 18 as needed to provide optimal viewing rearward or to a corresponding side. As shown in FIG. 5, the range of motion of the pivotably attached first 16 and second 18 mirrors provides a wide viewable range to a forward viewing user 42 of the multi-view mirror 10 that is observable without a need to rotate the head of the user. The field θ1 is an approximation of the field of view of a forward viewing user 42 of a traditional flat mirror compared to the greatly enlarged viewable fields θ2 that are viewable to a forward viewing user 42 using the multi-view mirror 10.

Figure 6:
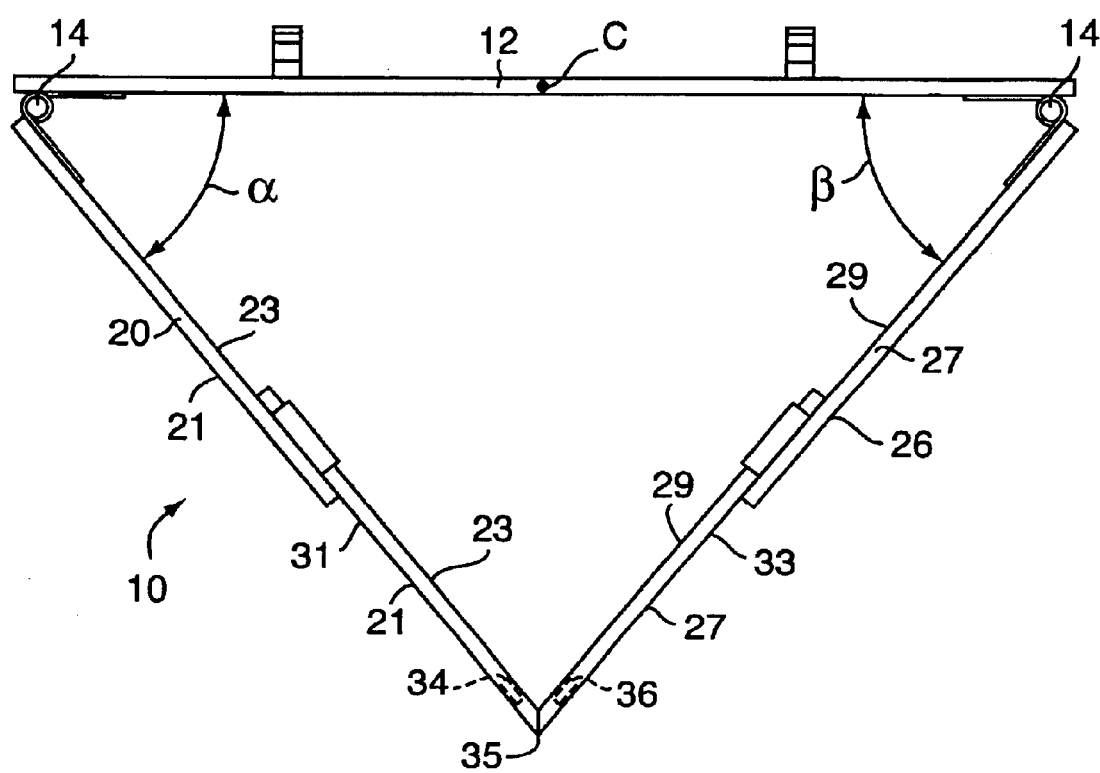
FIG. 6 is a top view of a multi-view mirror according to the present wherein the first and second mirrors include extendable viewing surfaces.

Additionally, referring to FIG. 6, the first and second mirrors 20 and 26 respectively may include reflective surfaces 23 and 29 respectively on a rear side thereof for further extending the viewing range of a user thereof. The FIG. 6 embodiment of the present invention mirror includes extendable portions 31 and 33 extendably coupled to the first and second mirrors 20 and 26 respectively for providing a continuous angled mirror 10 having an apex 35. In this embodiment, the handles 34 and 36 are mounted to the extendable portions 31 and 33 respectively. The extendable portions 31 and 36 include reflective surfaces 21, 23 and 27, 29 on both sides thereof.

As shown in FIG. 1, the first and second mirrors 20 and 26 are positioned in a generally flat position wherein the first second mirrors having nearly equal lengths $L_1$ and $L_2$ generally perpendicular to the axis of the hinges 14. However, the multi-view mirror of the present invention is not limited in this regard as the first and second mirrors 20 and 26 may have unequal lengths wherein the length $L_1$ of the first mirror 20 is greater than the length $L_2$ of the second mirror 26.

As shown in FIG. 1, the first and second mirrors 20 and 26 are pivotably attached to the mirror frame 12 via mounting elements shown in the drawings as butt hinges 14, however, other types of pivotal attachment means may be used, such as strap hinges, plastic hinges or flexible plastic attachments. The hinges 14 or other type of pivotable attachment enables a user to adjust the first and second mirrors 20, 26 to allow viewing of the side and rear of the user without rotating the head of the user.

The foregoing description of embodiments of the invention has been presented for the purpose of illustration and description, it is not intended to be exhaustive or to limit the invention to the form disclosed. Obvious modifications and variations are possible in light of the above disclosure. The embodiments described were chosen to best illustrate the principals of the invention and practical applications thereof to enable one of ordinary skill in the art to utilize the invention in various embodiments and with various modifications as suited to the particular use contemplated. It is intended that the scope of the invention be defined by the claims appended hereto.

What is claimed is:

1. A multi-view mirror for use in a vehicle, the mirror comprising:
    a frame having an inwardly disposed center and two outwardly disposed mirror mounting elements attached to the frame on opposite sides of the center;

a first mirror having a reflective surface on one side thereof, the first mirror having an outward edge pivotally mounted to one of the mounting elements of the frame and an inward edge disposed inwardly of the outward edge near the center of the frame;

a second mirror having a reflective surface on one side thereof, the second mirror having an outward edge pivotally mounted to another of the mounting elements of the frame and an inward edge disposed inwardly of the outward edge near the center of the frame;

the first mirror and second mirrors being angularly positionable relative to the frame between open and closed positions, the open position being wherein at least one of the first and second mirrors are pivoted about one of the mounting elements such that the mirror is positioned at an angle relative to the frame, the closed position being wherein the first and second mirrors are positioned substantially adjacent the frame, the inside edge of the first mirror being substantially adjacent the inside edge of the second mirror such that the first and second mirrors form a flat mirror generally in the plane of the frame;

each of the first and second mirrors mounted to the frame such that the reflective surface thereon faces away from the frame when the mirrors are in the closed position; and attachment means coupled to the frame for attaching the frame to a visor of a vehicle.

2. The multi-view mirror according to claim 1 further comprising a handle attached to at least one of the first and second mirrors for pivoting the mirror relative to the frame.

3. The multi-view mirror according to claim 1 wherein said mirror mounting elements comprise at least one hinge for coupling one of the first and second mirrors to the frame.

4. The multi-view mirror according to claim 1 wherein the attachment means includes at least one clip for attaching the frame to the visor of a vehicle.

5. The multi-view mirror according to claim 1 further comprising fastener means for releasably retaining the first and second mirrors in the closed position.

6. The multi-view mirror according to claim 5 wherein the fastener means includes at least one magnet.

7. The multi-view mirror according to claim 5 wherein the fastener means includes at least one spring.

8. The multi-view mirror according to claim 1 wherein at least one of the first and second mirrors further comprises a mirror extension slidably coupled thereto for extending a length of the reflective surface thereof.

9. The multi-view mirror according to claim 1 wherein the first mirror has a length substantially perpendicular to the axis of pivotable motion and the second mirror has a length substantially perpendicular to the axis of pivotable motion that is equal to the length of the first mirror.

10. The multi-view mirror according to claim 1 wherein at least one of the first and second mirrors includes a reflective surface on both a front side and a rear side thereof.

11. A multi-view mirror for use in a vehicle, the mirror comprising:

a mirror frame having an inwardly disposed center and two outwardly disposed mirror mounting elements attached to the frame on opposite sides of the center;

a first mirror having an outward edge pivotally mounted to one of the mounting elements of the frame and an inward edge disposed inwardly of the outward edge near the center of the frame;

a second mirror having an outward edge pivotally mounted to one of the mounting elements of the frame and an inward edge disposed inwardly of the outward edge near the center of the frame;

the first mirror and second mirrors each being pivotable about a corresponding one of the mounting elements such that each of the first and second mirrors are angularly positionable relative to the frame;

a mirror extension having a reflective surface on at least one side thereof slideably coupled to each of the first and second mirrors for extending a length of the reflective surface of the first and second mirrors; wherein the first and second mirrors are extendable when angularly positioned relative to the frame such that the first and second mirrors and attached mirror extensions cooperate to form a continuous mirror defining an apex wherein an inner edge of each of the mirror extensions intersect.

* * * * *